United States Patent [19]

Fischer et al.

[11] E Re. 29,904

[45] Reissued Feb. 13, 1979

[54] CRYOGENIC CONNECTION METHOD AND MEANS

[75] Inventors: Christopher L. Fischer, Sunnyvale; Richard F. Otte, Los Altos, both of Calif.

[73] Assignee: Raychem Corporation, Menlo Park, Calif.

[21] Appl. No.: 608,164

[22] Filed: Aug. 27, 1975

Related U.S. Patent Documents

Reissue of:

[64] Patent No.: 3,740,839
Issued: Jun. 26, 1973
Appl. No.: 157,890
Filed: Jun. 29, 1971

[51] Int. Cl.[2] ..... H01R 43/00

[52] U.S. Cl. ..... 29/628; 361/413

[58] Field of Search ..... 361/413, 411; 339/255, 339/30; 29/628

[56] References Cited

FOREIGN PATENT DOCUMENTS 1234303 3/1959 France ..... 339/30

*Primary Examiner*—David Smith, Jr.
*Attorney, Agent, or Firm*—Lyon & Lyon

[57] ABSTRACT

A reusable connecting device is disclosed which utilizes a heat recoverable metallic band disposed about a resilient member such as the tines of a forked member. Where the resilient member is a forked member, the forked member has at least two tines which are spaced from one another and which are elastically mounted so that they can be moved inwardly but, when so moved, exert an outward force. When it is desired to make a connection between this device and other objects, the object is placed between adjacent tines and the metallic band is caused to shrink thereby forcing the tines towards one another and causing them to contact and hold the object between them. The device is reusable in that when the temperature of the metallic band is lowered to cause the metal to transform to a martensitic state, it may be easily deformed due to a decrease in yield strength. The elastic nature of the tines or other resilient member causes them to push against the band resulting in a deformation of the band. This deformation permits the tines to move away from one another and releases the object held therebetween. However, once the metallic band is heated to a temperature at which the band reverts to its austenitic state, the band again contracts and moves the tines toward one another permitting a strong electrical or physical connection to be made.

19 Claims, 4 Drawing Figures

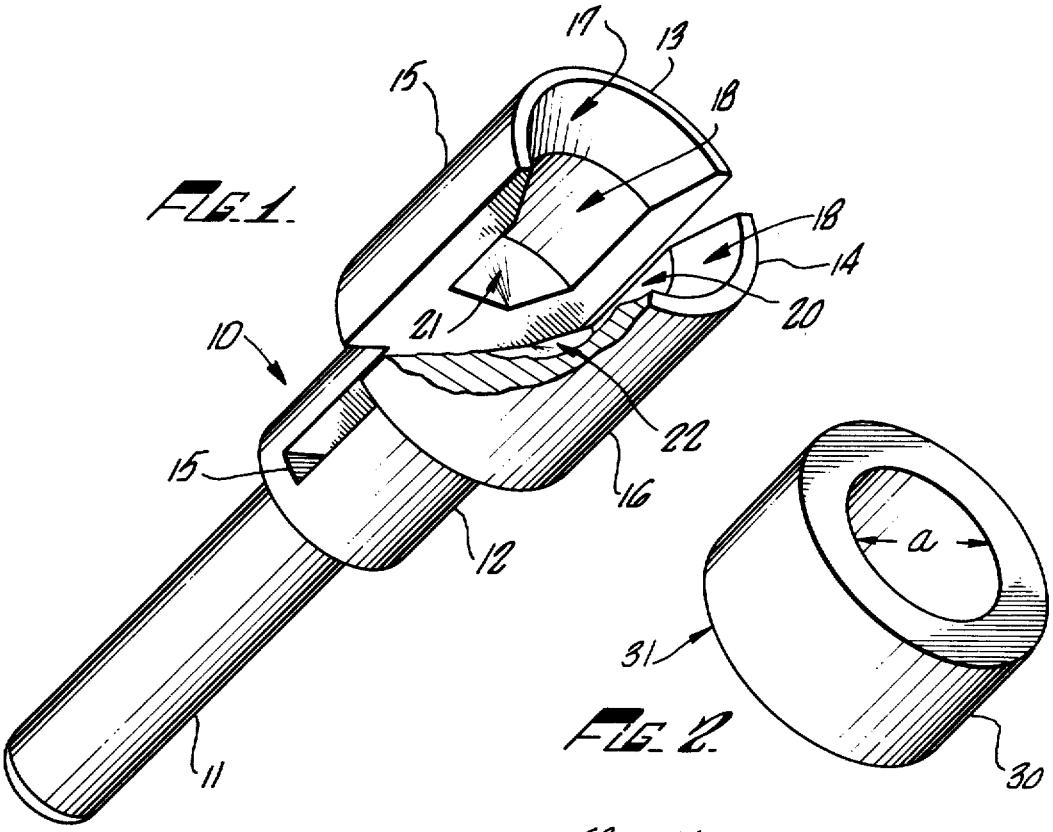
FIG. 1.
FIG. 2.
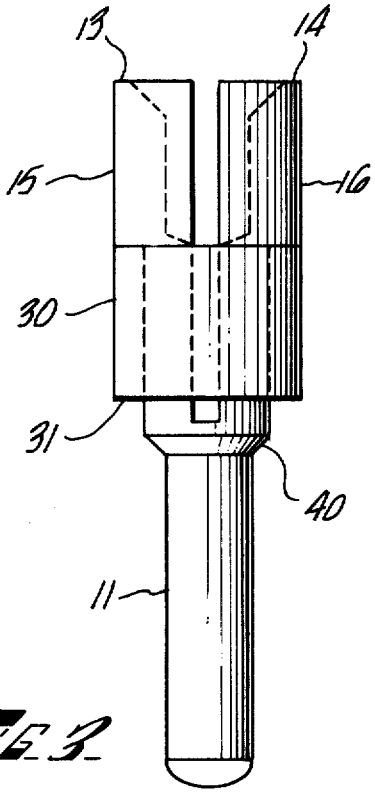
FIG. 3.
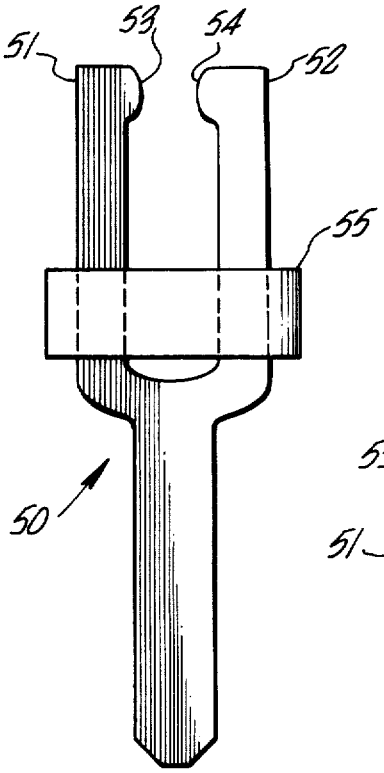
FIG. 4.
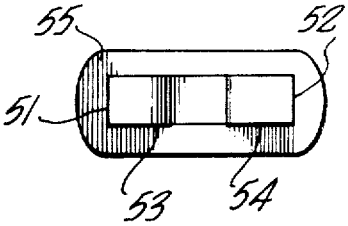
FIG. 5.

CRYOGENIC CONNECTION METHOD AND MEANS

Matter enclosed in heavy brackets [ ] appears in the original patent but forms no part of this reissue specification; matter printed in italics indicates the additions made by reissue.

BACKGROUND OF THE INVENTION

The field of the invention relates to connectors which are capable of forming either a physical or electrical connection between two or more objects. Widely used connection means include a pin and socket connection, a soldered connection, and a nut and bolt connection and a wide variety of crimped connections.

While pin nd socket connections are generally reusable, the strength of the resulting physical or electrical connection is not sufficient to many applications. While a soldered connection typically provides sufficient electrical continuity, it is often not reusable because of its physical location or the heat sensitivity of closely related parts. Nut and bolt connections can come loose and are difficult to use in close quarters. While crimped connections generally have sufficient physical strength, they are usually not reusable. Thus, there is a recognized need for a connector which can form both an excellent electrical as well as a physical connection with another object.

Heat recoverable metals are disclosed in U.S. Pat. Nos. 3,012,882 to Muldawer et al. and 3,174,851 to Buehler et al. and Belgian Pat. No. 703,649 to Wang et al. the disclosures of which are incorporated by reference herein to illuminate the background of the present invention. As made clear in these patents, these alloys undergo a transition between an austenitic state and a martensitic state at certain temperatures. When they are deformed up to 5 to 10 percent while they are in the martensitic state, they will retain this deformation while held in this state but will revert to their original configuration when they are heated to a temperature at which they transform to their austenitic state. This ability to shrink upon warming has been utilized in at least one U.S. patent application to Harrison et al. Ser. No. 51,809 which application is assigned to the assignee of the present application. The disclosure of that application is incorporated by reference herein to illuminate the background of the present invention. The temperatures at which these transitions occur are affected, of course, by the nature of the alloy. A group of alloys having a particularly useful transition temperature is disclosed in another application to Harrison et al. Ser. No. 52,122 which is also assigned to the assignee of the present application and which is also incorporated by reference herein for purposes of background.

While heat recoverable metals have been known for some time, their use in connecting devices has been limited by the relatively small percent deformation they exhibit when they are recovered. The amount of recovery is dependent upon the alloy used as well as the means by which it has been expanded. The recovery is typically limited to 6 to 8 percent of heat recoverable strain. Furthermore, those alloys which exhibit the desired heat recoverability are not necessarily themselves excellent electrical conductors nor do they necessarily exhibit the ability to be readily soldered. Still further, the use of heat recoverable metals often required that the metal be manually forced over a mandrel or other object in order to cause the expansion of the metal.

SUMMARY OF THE INVENTION

It is an object of the present invention to form a reusable connecting device which is capable of forming a strong physical connection between the device and another member.

It is another object of the present invention to provide a reusable connecting device which is capable of forming an electrical contact which will provide very low resistance.

It is a further object of the present invention to provide a reusable connecting device which may be reused without the application of heat greater than ambient temperature.

It is yet another object of the present invention to provide a reusable connecting device which will utilize a heat recoverable metallic material and yet still be capable of movement greater than 6 to 8 percent.

It is a still further object of the present invention to provide a method for physically expanding a heat recoverable member without the application of any external force.

These and other objects of the invention are brought about by the use of resilient member such as a forked member having at least two tines which are capable of being moved inwardly and when so moved exert an outward force on the means which is moving them inwardly. A band of heat recoverable metallic material is placed around the exterior of the tines of the forked member and the object to which the device is to be connected is inserted between adjacent tines. The metallic band is caused to shrink in a manner discussed below, thereby urging the two tines toward one another and against the object between them. When the band is placed near the base of the tines, the amount of dimension change of the band is magnified at the tips of the tines. Thus, on a theoretical basis, a 6 to 8 percent heat recoverable strain of the heat recoverable band can be magnified to 16 percent or more by this location of the band. The device is reusable merely by cooling the band to a temperature at which it exists in its martensitic state, in which it is deformed by the outward force exerted by the tines of the forked member. Thus, when so cooled, the forked member will open, releasing the object between its tines. When the device is again warmed, the metallic band will revert to its austenitic state thereby regaining its strength and its former dimension and again bringing the tips of the tines together. The reversible nature of the present invention may be achieved by the use of resilient members other than a forked member. It is only necessary that the heat recoverable material be subjected to a force which is insufficient to plastically deform it while it is in its austenitic state and yet sufficient to cause heat recoverable deformation of the material when it is in its martensitic state.

BRIEF DESCRIPTION OF THE DRAWINGS

FIG. 1 is a perspective view, partially cut away, of the forked member of the device of the present invention.

FIG. 2 is a perspective view of the band used in the connecting device of the present invention.

FIG. 3 is a side view of the connecting device of FIGS. 1 and 2.

FIG. 4 is a side view of an alternate configuration of the connecting device of the present invention.

FIG. 5 is a top plan view of the connecting device of FIG. 5.

DESCRIPTION OF THE PREFERRED EMBODIMENTS

A preferred reusable connecting device of the present invention comprises a forked member and a band of a heat recoverable metallic material. One configuration of such device is shown in FIG. 1 where forked member 10 has a lower cylindrically shaped pin member 11 which is integrally connected to an intermediate cylindrical portion 12 which, in turn, is integrally connected to two tines 13 and 14. The tines extend upwardly from base 15 which is located in cylindrical portion 12 and may be mechanically separated to increase the total mechanical force.

Tines 13 and 14 have outer semi-cylindrical portions 15 and 16 respectively. They further have partial frustro-conical depressions 17 and 18 respectively. Each tine also has an inner semi-cylindrical openings 19 and 20. At the base of each opening are semi-conical depressions 21 and 22.

The forked member of FIG. 1 cooperates with the band of metallic material capable of having the property of heat recoverability imparted thereto which is shown in FIG. 2 in perspective view and indicated by reference character 30. Band 30 is ring-shaped and its size, with respect to cylindrical portion 12, forms an important aspect of the present invention. The composition and properties of band 30 will be discussed in more detail below but its operation may be described briefly as follows. Band 30 and, preferably, forked member 10 are cooled to a temperature at which the metallic material of which band 30 is composed exists in its martensitic state. The temperature required for such a condition depends upon the composition of the metal. A representative temperature might be −40° C and band 30 can be cooled to such temperature be spraying a low boiling liquid such as trichlorofluoromethane thereon or by placing the band in a refrigerated compartment below −40° C or by any other manner which brings its temperature to below that required for the martensitic transformation to take place.

After band 30 has been converted to its martensitic state, it is then forced over cylindrical portion 12 or forked member 10. As shown in FIG. 3, an integral frustro-conical portion 40 is located between cylindrical portion 12 and pin member 11. Portion 40 helps to expand band 30 in the manner described below.

The inside diameter "a" of band 30 varies depending upon whether band 30 is in its austenitic or martensitic state and, if in the latter, upon whether it has been stressed. When band 30 is in its austenitic state, inside diameter "a" must be smaller than the outside diameter of cylindrical portion 12 of the forked member of FIG. 1. When band 30 has been cooled to a temperature at which it exists in its martensitic state, it may be expanded within a limited range and will spontaneously revert to its original dimensions upon a transition from its martensitic state to its austenitic state. Of course, it is possible to deform band 30, while it is in its martensitic state, to a degree where it will not return to its original configuration and thus be permanently deformed or even pulled apart. It is important that the outside diameter of cylindrical portion 12 by selected so that it will not cause band 30 to be significantly deformed or weakened.

Having selected the appropriate dimensions and having cooled band 30 to a temperature at which it exists in its martensitic state, band 30 is next slid over pin member 11 and in contact with frustro-conical portion 40. With the forked member 10 securely held, pressure is applied on lower surface 31 of band 30 forcing it upwardly over frusto-conical portion 40 thereby radially expanding band 30. The natural stiffness of the tines of forked member 10 must be sufficient to deform the band while the band is in its martensitic state and be flexible enough to be moved inwardly by the band when it is transformed to its austenitic state. The device, while maintained at a stable temperature is now capable of having a pin member inserted therein and forming a secure connection. For instance, a second forked member, such as that shown in FIG. 1, might then be inserted into the partial cylindrical opening formed by openings 19 and 20. The size of openings 19 and 20 are selected so that the object to which the device will be connected will fit readily therein as long as the device is held at a temperature at which band 30 exists in its martensitic state. Once the object has been inserted in the connecting device, ring 30 is warmed to a temperature at which it will transform from its martensitic state to its austenitic state. During this transformation, the band 30 will revert to its original dimension thereby shrinking around cylindrical portion 12 and forcing tines 13 and 14 in secure contact with the object which has been placed between them. As long as the temperature is maintained above the temperature which band 30 will reconvert to its martensitic state, it will remain in its austenitic state and thus will remain in its heat recovered dimension. It will then continue to hold the object. The device is, however, reusable in that when band 30 is cooled to a temperature which it will transform to its martensitic state, a force exerted upon it by the natural resiliency of tines 13 and 14 will once again deform band 30 and permit the objects between tines 13 and 14 to be readily removed.

Turning now to FIGS. 4 and 5 an alternate configuration of a connecting device of the present invention is shown. Forked member 50 has tines 51 and 52 which have protrusions 53 and 54 at their tips. A generally rectangular continuous band 55 is placed near the base of tines 51 and 52. Band 55 has an inside dimension sufficient that it is capable of bringing protrusions 53 and 54 together when it is in its austenitic state and yet will be caused to expand when in its martensitic state by the natural flexibility of tines 51 and 52.

In operation, band 55 is forced around forked member 50 in a manner analagous to that described above. Once in its martensitic (low temperature) state, an object may be inserted between protrusions 53 and 54. When band 55 is warmed to a temperature at which it transforms to its austenitic (high temperature) state, it will shrink, forcing protrusions 53 and 54 against the object inserted between them.

Note that the movement of protrusions 53 and 54 will be greater than the movement of band 55. This is caused by the action of the lever principle where the fulcrum is below the base of tines 51 and 52 and the force is applied at the location of band 55 on lever arms 51 and 52. By a further lengthening of tines 51 and 52, even greater movement can be obtained.

While the above devices show only a single band, two or more bands may be utilized to increase the closing force of the device. Furthermore, while bands 30 and 55 of the drawings have been shown as continuous bands, they need not be continuous and could be C-shaped having an opening along one side. Likewise, while the two forked members 10 and 50 shown in the drawings utilize two tines, the present invention comprehends the use of three or more tines. Still further, while forked member 10 and 50 are shown as having integral tines, the device could have tines which are hinged at their base as long as means are provided to cause the tines to spring back once they have been urged together. This spring-back force must, as stated above, be sufficient to expand the band when the band is in its martensitic state. For instance, a spring could be provided between the two tines for this purpose.

It has been found that a particularly effective material from which an integral forked member may be fabricated is beryllium copper. This material has high strength and yet may be soldered, plated and is itself an excellent electrical conductor.

The selection of transition temperatures is dependent upon the end use envisioned. The device should operate at a temperature at which the band is in its austenitic state and yet must be capable of being cooled to a temperature at which the band is in its martensitic state.

A device according to the present invention was fabricated from a bar of beryllium copper and a ring of heat recoverable metal alloy which was prepared by melt alloying from an original mixture contained 49.6 percent titanium, 46.8 percent nickel, and 3.6 percent iron. The device was similar to that shown in FIGS. 1 through 3 and was made for use in miniature circuits for stacking printed circuit boards. The device had an overall length of 0.152 inches. The pin member was 0.072 inches in length and had a diameter of 0.019 inches. The adjacent frustro-conical portion had a 45° chamfer and the central cylindrical portion had a diameter of 0.02925 inches and extended to a distance of 0.102 from tip of pin member 11. The cylindrical portion located downwardly from the tips of the tines had an outside diameter of 0.040 inches. This section had an inner cylindrical opening having a diameter of 0.020 inches and extending to a point 0.120 from the tip of pin member 11. A slot 0.006 inches wide was cut along the axis of the forked member and extended downwardly 0.078 inches from the tips of the tines.

The band of the present invention was a circular ring which, in its austenitic state, had an inside diameter of 0.026 inches. The band had an outside diameter of 0.37 and was 0.022 inches long.

It has been found that for most materials, it is preferable that the outside dimension of the portion of the forked member where the band is to be placed should have a dimension about 5 percent greater than the inside dimension of the band when the band is in its austenitic state. The degree of chamfer in the frustro-conical portion shown as 40 in the drawings may be varied depending upon the amount of force that is required to place the band in position. The more force required, the more gradual the chamfer of this portion. Alternatively, the band may be expanded by a separate device and simply placed over the forked member.

While the device of the present invention has been described utilizing a lever action which increases the amount of movement of the tines, it is possible that this lever action can be reversed to further increase the strength of the connection. Thus, the band could be placed near the tips of the tines and the object to be connected inserted between the band and the base of the tines. Although the movement against the object would be slight, its force would be great and, in some applications, such force may be required. The force exerted by the band when it is transforming to its austenitic state is very great and it is generally preferable that the band be placed near the base of the tines in order to increase the amount of movement of the tines.

It has been found that when the band is fabricated from an alloy containing major portions of titanium and nickel that the force required to expand the band while it is in the martensitic state is at a minimum and is a fraction of the force which the same band will exert upon transforming to the austenitic state. It is because of this property that the amount of natural spring-back in materials such as beryllium copper is sufficient to deform the band.

The device shown in FIGS. 1 through 3 is particularly useful for connecting a series of printed circuit boards. When so used, pin member 11 is placed through a hole in a circuit board and soldered to the board. Pin member 11 is then inserted into the upper cylindrical opening of a second identical forked member which is similarly soldered to a second printed circuit board. This insertion is made while the band is in its martensitic state. Thus, when a device is warmed the two printed circuit boards are securely attached and yet may be detached by cooling the assembly to below the transition temperature of the band. Since the device forms an extremely strong physical bond, it is not necessary that its use be limited to electrical connections and it may similarly be utilized for purely physical connections.

While any alloy exhibiting the above-described property of heat recoverability may be used, it has been found that alloys containing large proportions of nickel and titanium are particularly useful. This property has also been observed in alloys of gold and cadmium as well as in indium and thallium. As described in the Harrison application, Ser. No. 52,112, incorporated by reference herein, the addition of small amounts of iron with major amounts of titanium and nickel results in a group of alloys having transformation temperatures in a particularly useful range. Those alloys which fall within an area defined on a titanium, nickel and iron ternary phase diagram by a quadrilateral with the following corners have been found particularly useful: The first corner at 49.1 percent titanium, 47.3 percent nickel and 3.6 percent iron; a second corner at 49.1 percent titanium, 48.8 percent nickel and 2.1 percent iron; a third corner at 50.2 percent titanium, 46.8 percent nickel and 3.0 percent iron; and a fourth corner at 50.2 percent titanium, 45.1 percent nickel and 4.7 percent iron.

It has further been found that combinations of major proportions of titanium and nickel with major proportions of aluminum or manganese form useful heat recoverable alloys.

Particularly effective alloys for use with the present invention include alloys containing about 49 atomic percent titanium, about 49 atomic percent nickel and about 2 atomic percent cobalt; about 52 atomic percent nickel and about 48 atomic percent titanium; about 50 atomic percent titanium, about 48 atomic percent nickel and about 2 atomic percent iron.

While this specification has emphasized a resilient member which is a forked member, the present invention contemplates resilient members of other shapes.

The important requirement for the practice of the present invention is the use of a heat recoverable metal in combination with a member which exerts a force on the metal of a magnitude sufficient to deform the metal while it is in its martensitic state and at the same time that force is insufficient to restrain the metal when the metal transforms to its austenitic state. When this combination is achieved, a reusable, heat-recoverable device results which device does not require the use of a manual expanding step. Examples of other configurations which utilize the present invention include a pair of spring loaded contact members mounted within a heat recoverable band. Hydraulic resilient members may further be utilized and may be adapted to create a similar strain magnifying action to the above discussed forked member. Resiliency may be imparted to a hydraulic system by any known means such as a spring loaded piston, diaphram or closed gas chamber.

Also, while the present invention has emphasized the shrinking of a heat recoverable metal during its transformation from a martensitic state to an austenitic state, the present invention may also utilize an expansion of the metal during this same transformation. Thus, if the forked member of FIG. 1 contained an interior band of a heat recoverable metal, the device could be made to open upon warming and close upon cooling. In this way, upon warming, the ends of the tines could be made to contact the edges of a circular opening ring which had been placed about these ends when the heat recoverable metal was in its martensitic state. (In this instance a compressed state.)

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

What is claimed is:

1. A reusable connecting device comprising:

a forked member having at least two tines which tines are capable of being moved inwardly and when so moved exert an outward force;

at least one band of a metallic material capable of having the property of heat recoverability imparted thereto and capable of changing dimensions so as to increase the transverse dimension of said band with the application of the force applied by said forked member when cooled to a temperature where it exists in the martensitic state and further being capable of changing dimensions so as to decrease the transverse dimension without the application of external force when warmed to a temperature at which it exists in its austenitic state, each band being large enough to permit it to be forced around at least a portion of the exterior of said tines when in its martensitic state and being small enough to move said tines inwardly when warmed to its austenitic state.

2. The device of claim 1 wherein said forked member has two tines.

3. The device of claim 1 wherein said device has one band.

4. The device of claim 3 wherein said band is a continuous band.

5. The device of claim 3 wherein said band is around a lower part of said fork.

6. The device of claim 3 wherein said band is a ring.

7. A reusable connecting device comprising:

a forked member having at least two tines and being constructed from elastic material, said forked member having a cylindrical exterior located near the base of said tines;

a ring of a metallic material capable of having the property of heat recoverability imparted thereto and capable of changing dimensions so as to increase the transverse dimension of said ring with the application of the force supplied by said forked member when said ring is cooled to a temperature where it exists in its martensitic state, said ring being further capable of changing dimensions so as to decrease the transverse dimension without the application of external force when warmed to a temperature at which it exists in its austenitic state, said ring being large enough to permit it to be forced around said cylindrical exterior of said forked member when said ring is in its martensitic state and being small enough to move said tines inwardly when warmed to a temperature at which it exists in its austenitic state.

8. The device of claim 7 wherein said fork is fabricated from beryllium copper.

9. The device of claim 7 wherein said forked member has two tines.

10. The device of claim 7 wherein said ring exists in its austenitic state above about 0° C and in its martensitic state below about −40° C.

11. The device of claim 7 wherein said ring is fabricated from an alloy consisting essentially of about 49 atomic percent titanium, about 49 atomic percent nickel and about 2 atomic percent cobalt.

12. The device of claim 7 wherein said ring is fabricated from an alloy consisting essentially of about 48 atomic percent nickel, about 2 atomic percent iron and about 50 atomic percent titanium.

13. The device of claim 7 wherein said ring is fabricated from an alloy consisting essentially of about 52 atomic percent nickel, and about 48 atomic percent titanium.

14. The device of claim 7 wherein said ring is fabricated from a titanium, nickel and iron alloy within an area defined on a titanium, nickel and iron ternary phase diagram by a quadrilateral with its first corner at 49.1 percent titanium, 47.3 percent nickel and 3.6 percent iron; its second corner at 49.1 percent titanium, 48.8 percent nickel and 2.1 percent iron; its third corner at 50.2 percent titanium, 46.8 percent nickel and 3.0 percent iron and its fourth corner at 50.2 percent titanium, 45.1 percent nickel and 4.7 percent iron.

15. A device for stacking printed circuit boards said device being capable of forming both a physical and an electrical contact between adjacent boards, said device comprising:

a beryllium copper forked member having two tines the exterior of said device having a lower cylindrical section, a middle cylindrical section having a larger outside diameter than said lower cylindrical section and an upper section having a larger outside dimension than said middle cylindrical section said upper and middle sections having a slot cut therebetween thereby forming two tines of said forked member said upper section further containing a cylindrical hollow portion aligned about axially with said lower cylindrical sections and having an inside dimension about equal to the outside dimension of said lower cylindrical section; and a ring of a metallic material capable of having the property of heat recoverability imparted thereto and capable of changing dimension so as to increase the transverse dimension of said ring with the application of the force applied by said forked member when said ring is cooled to a temperature where it exists in its martensitic state said ring further being capable of changing dimensions so as to decrease the transverse dimension thereof without the application of external force when warmed to a temperature at which it exists in its austenitic state, said ring being large enough to permit it to be forced around said middle cylindrical section of said forked member when said ring is in its martensitic state, said ring being small enough to move said tines inwardly when warmed to a temperature at which it exists in its austenitic state.

16. A method for removably joining an object to a forked member having movable tines which tines tend to exert an outward force when they are forced inwardly, said method comprising:

cooling a band of a metallic material capable of having the property of heat recoverability imparted thereto to a temperature where it exists in the martensitic state, said band having an inside dimension about 5 percent smaller than the outside dimension of the base of the tines of said forked member;

forcing the cooled band about the exterior of the base of said tines thereby increasing its size about 5 percent;

placing an object between the tips of said tines; and warming said band to a temperature at which it exists in a martensitic state thereby causing said band to heat recover about the base of said tines and forcing the tips of said tines into contact with said object.

*17. A circuit assembly comprising in combination:*

*a. a plurality of individual circuit boards in a spaced relationship and*

*b. plural interconnect means for adjoining the circuit boards in said spaced relationship, each of said interconnect means being mounted in an aperture in a circuit board and comprising:*

*i. a forked member having at least two tines and an elongate pin portion, said forked member being mounted in said aperture so that the tines and the elongate pin portion are disposed on opposite sides of said circuit board, the tines being capable of being moved inwardly and when so moved to exert an outward force, and*

*ii. a band of a metallic material capable of having the property of heat recoverability imparted thereto and capable of changing dimension so as to increase the transverse dimension of said band with the application of the force applied by said forked member when the band is cooled to a temperature at where it exists in the martensitic state and further being capable of changing dimension so as to decrease the transverse dimension without the application of external force when warmed to a temperature at which it exits in its austenitic state, said band being large enough to permit it to be force around at least a portion of the exterior of said tines when in its martensitic state and being small enough to move said tines inwardly when warmed to its austenitic state;*

*the elongate portion of selected interconnect means being received in and held by the tines of selected other interconnect means when said band is in its austenitic state to maintain the circuit boards in said spaced relationship.*

*18. A circuit assembly according to claim 17 wherein said interconnect means are electrically conductive and provide an electrical connection between said circuit boards.*

*19. A circuit assembly comprising, in combination, a plurality of individual printed circuit boards, each of said boards having at least two opposed planar surfaces and interconnect means electrically connecting said board to another board each of said interconnect means including:*

*i. metallic housing means mounted in an aperture through the respective board and electrically connected to the circuit thereon,*

*ii. an electrically conductive elongated, rigid member extending from the housing means in one direction into the region between boards,*

*iii. receiving means comprising a slotted, cylindrical bore in the housing means, said bore facing in a direction opposite from the elongated member and having opposite jaw members, an end portion of an elongated member of an interconnect means mounted to the next adjacent board being assembled to said bore, and*

*iv. thermally expandable means assembled to said receiving means for deflecting said jaw members to selectively expand and contract said bore to selectively create an interference fit between said bore and an assembled elongated member;*

*said interconnect means being arranged on the planar surfaces of said boards.*

* * * * *